Figure 1:
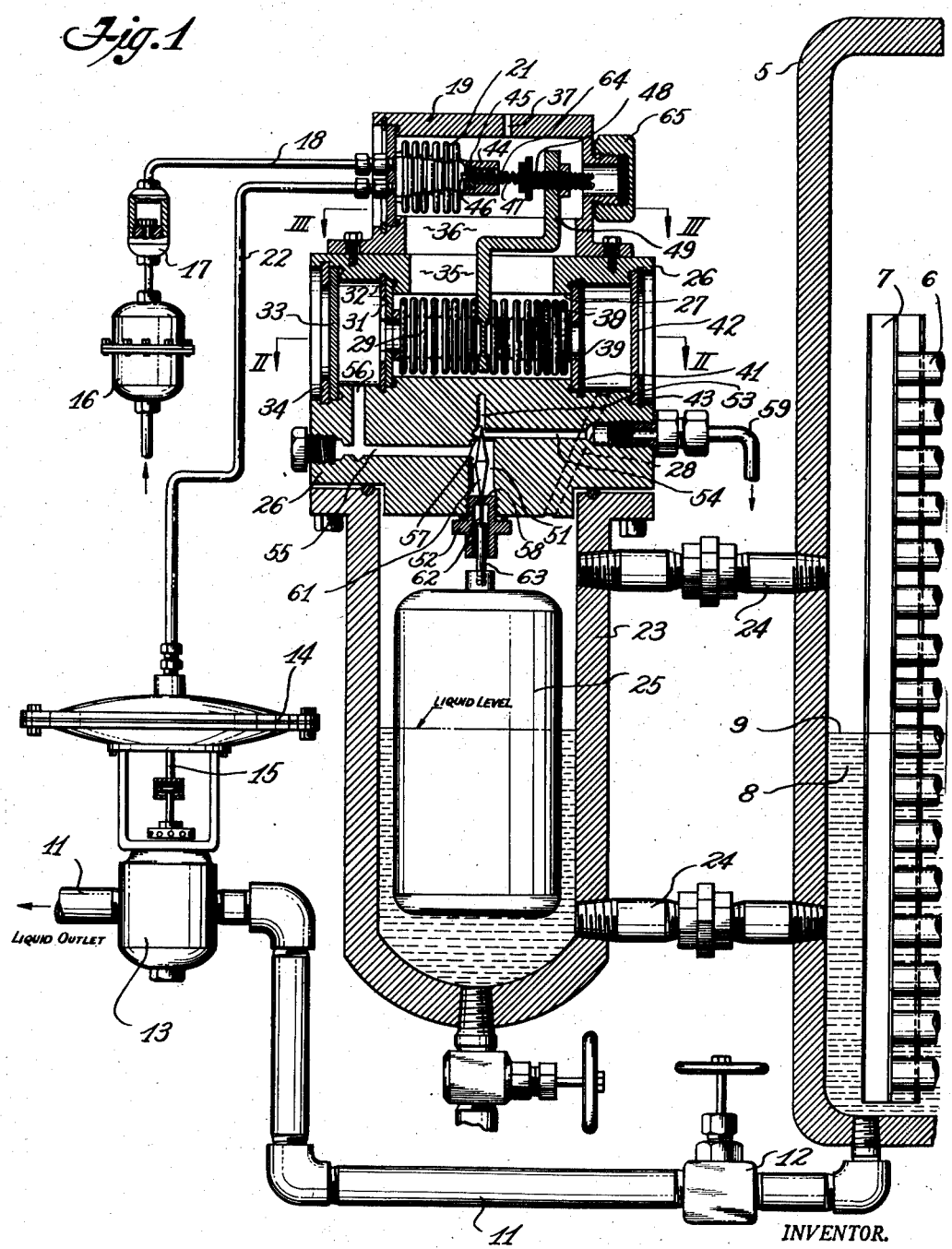

Sept. 18, 1951 W. M. MERCER 2,568,506
LIQUID LEVEL CONTROL MECHANISM
Filed March 10, 1947 2 Sheets—Sheet 1

INVENTOR.
WILLIAM M. MERCER
BY Harold W. Mattingly
Attorney

Sept. 18, 1951 W. M. MERCER 2,568,506
LIQUID LEVEL CONTROL MECHANISM
Filed March 10, 1947 2 Sheets-Sheet 2

INVENTOR.
WILLIAM M. MERCER
BY Harold W Mattingly
Attorney

Patented Sept. 18, 1951

2,568,506

UNITED STATES PATENT OFFICE 2,568,506

LIQUID LEVEL CONTROL MECHANISM

William M. Mercer, Los Angeles, Calif.

Application March 10, 1947, Serial No. 733,591

3 Claims. (Cl. 137—68)

My invention relates to liquid level controls, and has particular reference to a level responsive pilot valve adapted to actuate a control valve or other power driven mechanism that directly corrects the liquid level.

My invention may be advantageously utilized for automatically controlling and maintaining a constant liquid level in a pressure container by controlling the incoming or outgoing liquids, or both. Such controls are particularly desirable in distillation units wherein fractional distillation is utilized to separate the components of a complex liquid mixture. Such distillation units often comprise a chamber or pressure vessel in which may be placed a large number of heating tubes which may be heated in any suitable fashion, for example by constant temperature steam. If the vessel is completely filled with liquid a maximum heat absorption takes place, resulting in a maximum rate of evaporation. If this maximum rate of evaporation is excessive, there is an excessive bubbling or boiling of the liquid mixture that carries off the heavier components along with the lighter components. On the other hand, if the liquid level becomes too low within the pressure vessel, the rate of evaporation will be so low that the lighter components will remain and will be drawn off along with the heavier components of the mixture.

Apparatus of the type just mentioned is used, for example, in separating the components of natural gas gasoline. Such gasoline may be made up of various components such as propane, isobutane, normal butane, isopentane, pentane, etc. A separation of these components by fractional distillation is accomplished by pumping the liquid into a propane distillation unit, otherwise known as a depropanizer unit. This depropanizer unit is used to distill off or separate the propane from the other components, and accordingly may be operated at about 300 p. s. i. so that the resultant propane gas will be under a sufficient pressure so that it may be economically condensed into liquid propanes. Normally the distillation may take place in specific distillation units when the pressure vessel is one-third full, and if the level becomes higher than that precisely predetermined, there will be an excessive boiling off of the heavier components, and if the liquid level becomes too low, the propane will not be effectively removed and will remain in the mixture and will be carried over to subsequent distillation units.

Such distillation units at present employ a float responsive control mechanism for maintaining the liquid level. This level may be maintained either by regulation of the incoming mixture, or by regulation of the out-flow of the depropanizer liquid. Such control mechanisms at present generally include a shaft rotating connection between the float and the control mechanism, and the shaft passes out through the pressure vessel through a packing gland sufficiently strong and tight to seal the operating pressure. With this type of liquid level control it requires a great amount of variation in the liquid level to operate the control due to the friction encountered at the packing gland. For example, variations of four inches are often required to operate this type of control mechanism, whereas for economical operation the liquid level should not vary more than a half inch.

My invention provides an apparatus that is inherently free from frictional effects, inasmuch as packing glands are completely eliminated. The movement of a float in response to a change of liquid level operates a finely adjusted valve mechanism which in turn may operate a pilot valve controlling flow to a power operated valve. The control achieved by apparatus embodying my invention accordingly may be held within the desired tolerances of a half inch or less.

It is therefore an object of my invention to provide a liquid control mechanism that is entirely free from packing glands.

Another object of my invention is to provide a liquid control mechanism that is entirely free from sliding or rotational engagements such as would require bushings or bearings with their resultant frictional drag upon the apparatus.

A further object of my invention is to provide a pressure responsive pilot valve mechanism for operating a power device that directly controls a liquid level.

Still another object of my invention is to provide a pilot valve actuated by a float responsive valve.

A further object of my invention is to provide a power valve control system wherein a pilot valve may utilize a slow bleed from a high pressure source of operating fluid.

Figure 2:
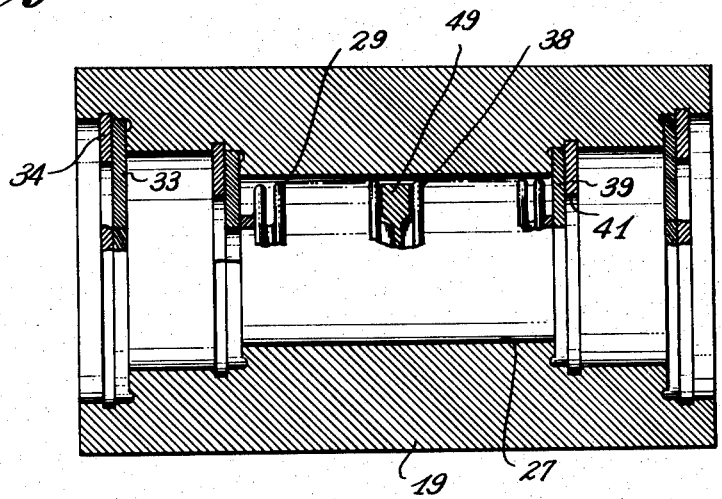
Figure 3:
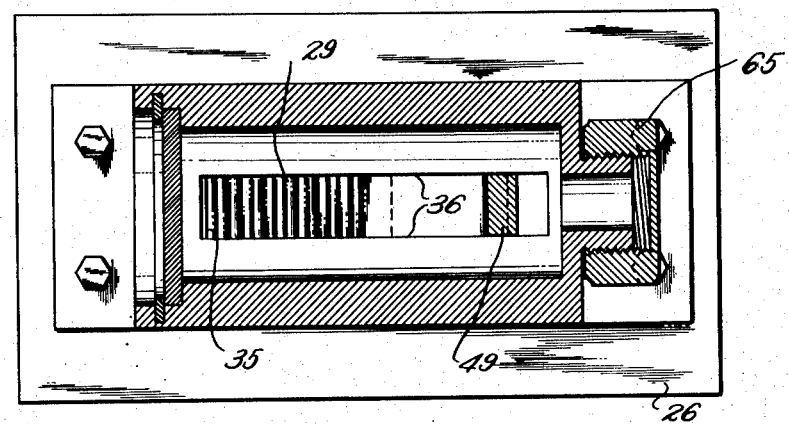

Other objects and advantages of my invention will be apparent in the following description and claims, considered together with the accompanying drawings, in which Fig. 1 is an elevation view partly in section and partly schematic of a distillation unit employing a control mechanism and system embodying principles of my invention;

Fig. 2 is an enlarged sectional view taken along the line II—II of Fig. 1 illustrating the assembly of the multiple bellows actuator; and Fig. 3 is a sectional view taken along the line III—III of Fig. 1.

Referring to the drawings, a distillation unit 5 may include a plurality of heater tubes 6 fed by a common header 7 which may be connected to any suitable heated fluid such as constant temperature steam. Liquid may be fed into the distillation unit 5 by any suitable means such as a constant feed pump or fixed orifice so as to form a pool of liquid 8, the level of which must be precisely controlled so that only a fixed number of heating tubes 6 are immersed therein. The number of tubes thus immersed may be determined experimentally or by calculation so as to obtain a fixed rate of evaporation that will remove only the desired component from the liquid. For example, if the liquid 8 were natural gas gasoline and it was desired to remove only the propane, the liquid level might be that indicated in Fig. 1, which level may also be identified by the numeral 9. The pressure vessel 5 might be maintained at any suitable pressure without affecting in any respect the operation of the illustrated mechanism embodying the invention, and for example might be maintained at 300 p. s. i.

The distillation of a light component from the liquid 8 will result in a heavy remaining liquid that must be periodically drained off to maintain the liquid level as the heavier portions of the incoming liquid accumulate. Accordingly an outlet conduit 11 may be provided in which a suitable hand shut-off valve 12 may be inserted, and the flow through the conduit 11 may be further controlled by a power operated valve 13 furnished particularly in accordance with the invention. In the normal operation of the mechanism, the hand valve 12 is completely opened and the power operated valve 13 alone controls the outlet flow. The power operated valve 13 may be operated in any suitable manner, either mechanically, electrically, or hydraulically, but I prefer for the illustrated embodiment to employ compressed air as the operating power medium. Accordingly a diaphragm assembly 14 may be secured to the top of the valve 13 and a piston rod actuator 15 may be secured thereto to actuate the valve 13. Air under pressure may be supplied from any suitable source, such as a compressor, and may pass through a filter unit 16, a bleeder orifice or throttle 17, through a tube 18, into a pilot valve housing 19 provided particularly in accordance with the invention. The throttled air may then pass into a flexible bellows 21 which may be in communication with a conduit 22 leading directly to the diaphragm actuator 14 for the valve 13.

While various level responsive mechanisms could be employed, I prefer at present to use a float as my liquid level responsive mechanism, and accordingly I provide a float housing 23 which may be connected on either end by conduits 24 coupled to the pressure vessel 5 above and below the desired liquid level line so that a corresponding liquid level will be maintained in the float housing. A float 25 may be disposed within the housing 23 and may have any suitable construction, for example of hollow non-corrosive metal. Secured and sealed to the top of the float housing 23 may be a main valve housing 26 having a large transverse stepped bore 27 therethrough, the right end of which is communicated directly with the interior of the float housing 23 by means of a passage 28.

A pressure responsive mechanism may be provided within the valve housing 26 by positioning a bellows 29 therein which may be held in place in any suitable manner, for example by an apertured disk 31 to which it may be secured, which disk may be sealed against a step in the bore 27 and held in place by a snap ring 32. The left end of the bore 27 may be completely sealed by means of a solid disk 33 sealed on another step of the bore 27 and held in place by a snap ring 34. The middle portion of the bore 27 may be vented to atmosphere by means of a slot 35 in the top of the main body 26, which slot may be disposed opposite a slot 36 in the pilot valve body 19. A vent 37 may be provided in the pilot valve body 19 to directly communicate the interior of that valve body to atmosphere.

Inasmuch as variations in the pressure in the distillation unit 5 may upset the precise control desired, I provide a counterbalancing bellows 38 secured in any suitable fashion within the bore 27, for example by an apertured disk 39 sealed against a shoulder and held in place by a snap ring 41. The right end of the bore 27 may be completely sealed by a solid disk 42 positioned and sealed against a shoulder by means of a snap ring 43. As previously mentioned, the right end of the bore 27 is communicated to the interior of the float housing 23 by means of the passage 28, and accordingly the pressure within the distillation unit 5 will be transmitted through the tubes 24 to the interior of the float housing 23 and through the passage 28 to the right end of the bore 27 where the pressure will be applied against the interior of the bellows 38, the exterior of which is subject only to atmospheric pressure.

Referring now to the operation of the pilot valve itself, it will be noted that the bellows 21 disposed within the pilot valve housing 19 may have a fitting 44 on the inner end thereof into which may be threaded a valve seat member 45 through which may project a poppet valve 46 to seat on the interior of the bellows 21. The pilot valve 46 may have a stem 47 secured thereto engageable by means of an adjustable stem 48 threaded into an actuator member 49 having its lower end disposed between, and securely fastened to, the adjacent ends of the bellows 29 and 38. As previously noted, a power supply medium may be compressed air under pressure which is bled by the throttle valve 17 into the expansible bellows 21. Accordingly, as the pressure within the bellows 21 builds up, the bellows will elastically expand, and if the poppet valve 46 is maintained in a stationary position, the valve seat 45 will move away from the poppet 46, permitting this air to escape through the fitting 44 to the interior of the housing 19 and thence to atmosphere through the vent 37. If, however, it is desired to build up a sufficient pressure within the bellows 21 so as to cause the diaphragm actuator of the outlet valve 13 to operate, the control mechanism for the pilot poppet 46 may cause this poppet to move to the right along with the expanding bellows, thus sealing within the bellows 21 the air bled from the throttle 17. In this fashion the pressure within the bellows 21 may be built up to any desired pressure short of the maximum available pressure so that an actuating pressure may be applied to the diaphragm unit 14.

From the foregoing operation of the pilot valve, and assuming that the outlet valve 13 is normally closed, it will be realized that a movement of the actuator member 49 to the right will be desired when the liquid level becomes too high. This will cause the pressure to develop within the pilot bellows 21 so that the pressure may be applied to the valve actuator 14. If, however, the liquid level becomes too low, it is necessary to move the actuating member 49 to the left so as to open the valve 46 and thereby bleed the pilot bellows 21 into atmosphere, removing any actuating pressure from the diaphragm assembly 14. This movement of the actuating member 49 may be effected in accordance with my invention by utilizing the pressure within the float housing 23, which of course will be the same as the pressure within the distillation unit 5. Accordingly the main valve body 26 may be apertured above the float housing 23 as at 51, and a valve fitting 52 may be threaded into the lower end thereof and sealed against the surface of the valve body 26 that is exposed to the float housing pressure. A smaller bore 53 may be concentrically extended from the inner end of the bore 51, and a cross bore 54 may intersect with this smaller bore 53. A cross bore 55 may communicate the larger bore 51 to the left end of the main bore 27 by means of a parallel bore 56. It will be noted that the intersection of the extended bore 53 with the large bore 51 will provide a valve seat 57 so that two aligned valve seats are present; namely the valve seat 57 and a valve seat 58 formed in the fitting 52.

The cross bore 54 may be vented to a low pressure such as atmospheric pressure, but inasmuch as the gas that may escape through this vent will be the gas within the distillation unit 5 that will have commercial value, a conduit 59 may be connected thereto to lead this vented gas to any suitable drain.

The flow from the interior of the float housing 23 through the valve seat 58 to the pressure responsive bellows 29 and also the flow through the valve seat 57 may be controlled by a double-ended, double-conical pressure supply valve member 61 connected by a thin stem 62 to a pin 63 threaded into the top of the float 25. Accordingly when the float is raised, the top end of the valve member 61 will seat on the valve seat 57, closing flow through that valve seat, and at the same time an opening will be present at the valve seat 58 between the valve seat and the thin stem 62. Conversely, if the float drops, the lower end of the valve element 61 will seat on the valve seat 58 and the upper valve seat opening 57 will be open. Accordingly when the liquid level drops, the high pressure gas within the float housing 23 will be sealed at the valve seat 58 and the pressure responsive bellows 29 will be vented to atmosphere through the conduits 56 and 55, the valve seat 58 and the conduit 54 to the drain line 59. This will cause the bellows 29 to contract due to the superior pressure in the bellows 38, moving the actuating member 49 to the left and unseating the poppet 46 which will allow pressure within the pilot bellows 21 to bleed to atmospheric pressure. The valve 13 accordingly will be closed and no liquid will flow out of the outlet conduit 11. When the liquid level becomes high, the valve seat 57 is closed, and pressure from the interior of the housing 23 flows through the fittings 52 through the passages 55 and 56 to the interior of the bellows 29. This pressure, together with the compression of a spring 64 disposed about the valve stem 47, will urge the pilot 46 to the right, causing the pressure within the pilot bellows 21 to accumulate until an actuating pressure is achieved. A cap 65 may be removed from the pilot housing 19 to permit adjustment of the stem 48 and correspondingly adjusting the operating position of the pilot poppet 46.

In operation, the mechanism illustrated will maintain the liquid level control between limits determined solely by the amount of movement of the pressure supply valve member 61 necessary to uncover one valve and close another. While this control has been achieved within a limit of a half inch in order to meet specific specifications, it will be readily apparent to those skilled in the art that the valve member 61 could be so shaped as to actuate with a much shorter movement or much greater movement, as desired.

The complete operation of the apparatus embodying the invention may best be described with reference to Fig. 1, where it is shown as applied to a distillation unit, as previously mentioned. Assuming that the liquid level 9 is to be maintained by controlling the liquid outlet flow through the conduit 11 by means of the automatic power operated valve 13, this liquid level will be reflected directly in the liquid level within the float housing 23 because of the communications with the distillation unit 5 through the conduits 24. When the exact liquid level is maintained, the float 25 will position the double-ended valve member 61 midway between the two valve seats 58 and 57 so that they are both open and there will be a bleed of gas from the interior of the float housing 23 through the valve seats 58 and 57 and through the passage 54 to the drain line 59, where the gas may be recovered or exhausted, as desired. If, however, the liquid level 9 should rise above this normal level as shown, the float 25 will rise, carrying with it the valve member 61, closing the valve seat 57, and opening communication wide through the valve seat 58. Thus the full head of pressure within the housing 23, which may be of the order of several hundred p. s. i., will be available for actuation purposes, and this pressure will be transmitted through the passages 55 and 56 to the interior of the pressure responsive bellows 29, which bellows is counterbalanced by the bellows 38 communicated to the float housing 23 by the passage 28 shown in broken outline. The pressure on the interior of the pressure responsive bellows 29, together with the spring 47 within the pilot housing 19, and together with the algebraic sum of various spring loads inherent in the bellows 29, 38, and 21, will cause the actuating member 49 to move to the right. This will cause the poppet 46 to seat upon the seat 45 so that the slow bleed of air from a high pressure source (not shown) and received through the conduit 18 will build up in pressure within the bellows 21. When this pressure reaches a required amount it will be transmitted through the conduit 22 to the diaphragm actuator 14, which will cause the valve 13 to open, causing liquid to be bled out the outlet conduit 11, causing the liquid level 9 to drop. This dropping liquid level will be reflected in the liquid level within the float housing 23 and will cause the float to drop, unseating the member 61 at the valve seat 57 and permitting the pressure to vent to the drain line 59. This will release the pressure within the actuating bellows 29, and the superior pressure within the bellows 38 will cause the actuator 49 to move to the left. This will unseat the pilot poppet 46, permitting the pressure within the pilot bellows 21 to vent to atmosphere. This will release the actuating pressure within the diaphragm actuator 14, allowing the valve 13 to close. If the liquid level becomes lower than normal, the valve element 61 will seat completely on the valve seat 58, opening the communication through the valve seat 57 wide to the drain line 59.

It will be realized that the most accurate control of the liquid level will be obtained when the valve 13 is of the variable type so that it may be opened to any desired amount instead of wide open or full shut. Accordingly, therefore, it will be realized that the apparatus just described lends itself to this type of control so that the pressures within the pilot bellows 21 may vary from atmospheric to the full available pressure. Accordingly, therefore, this range of pressures within the bellows 21 may be obtained by the various positions of the valve member 61 between its two valve seats 58 and 57. Thus the mechanism may be continuously operating instead of being either operating or non-operating, intermittently. In this manner precise liquid level control may be obtained even within the limit of movement of the valve member 61 that is necessary to close one valve and then the other.

While I have described my invention with respect to a specific embodiment thereof, I do not limit myself to this specific embodiment inasmuch as it is obvious to those skilled in the art that various modifications may be made therein without departing from the true spirit and scope of the invention. Also it is obvious that the invention could be utilized to control inlet flow as well as outlet flow. Accordingly, for these and other reasons, I do not limit myself to the specific structure, nor limit myself in any other way, except by the terms of the following claims.

I claim:

1. A pilot assembly for regulating the level of a liquid in a pressure vessel comprising a float housing communicated with the pressure vessel and open at the top, a float disposed within the float housing, a poppet valve body disposed upon the housing and sealing the top, a pressure responsive bellows disposed within the housing, a communication from the float housing to the interior of the pressure responsive bellows, a counteracting bellows disposed within the valve body subject at all times to the pressure within the float housing, a vent connected to the communication, a double ended poppet carried by the float projecting into the communication to seal off the vent when the float moves upwardly and simultaneously to open the communication and to close off the communication when the float moves downwardly and to simultaneously open the vent, a conduit connected to the pressure vessel, a valve for controlling flow in the conduit, a fluid pressure actuator for actuating the valve, a source of fluid under the pressure having a limited fluid supply, an expansible pilot bellows communicated with the source and the actuator and carrying a valve seat on its movable end, a valve poppet associated with the expansible pilot bellows and movable inwardly from the seat to open the valve, and a mechanical connection between the pressure responsive bellows and the pilot poppet, whereby the poppet will become unseated when the pilot bellows expands past a variable point determined by the expansion of the pressure responsive bellows.

2. A pilot assembly for regulating the level of a liquid in a pressure vessel comprising a float housing communicated with the pressure vessel and open at the top, a float disposed within the float housing, a poppet valve body disposed upon the housing and sealing the top, a pressure responsive bellows disposed within the housing, a communication from the float housing to the interior of the pressure responsive bellows, a counteracting bellows disposed within the valve body subject at all times to the pressure within the float housing, a vent connected to the communication, a double ended poppet carried by the float projecting into the communication to seal off the vent when the float moves upwardly and simultaneously to open the communication and to close off the communication when the float moves downwardly and to simultaneously open the vent, a conduit connected to the pressure vessel, a valve for controlling flow in the conduit, a fluid pressure actuator for actuating the valve, a source of fluid under the pressure having a limited fluid supply, an expansible bellows communicated with the source and the actuator and carrying a valve seat on its movable end, a valve member associated with the expansible pilot bellows and movable inwardly from the seat to open the valve, a mechanical connection between the pressure responsive bellows and the pilot valve member, whereby the pilot valve member will become unseated when the pilot bellows expands past a variable point determined by the expansion of the pressure responsive bellows, and an adjustment disposed between the mechanical connection and the pilot valve member.

3. In a liquid level controller for vessels in which a liquid is partially evaporated and having a main valve for controlling the rate of flow of liquid therethrough actuated by pneumatic power controlled by a pilot valve, the combination of a float exposed to the liquid in the vessel to assume a position corresponding to the level of the liquid in the vessel, a valve chamber having a pair of opposed valve seats, one communicating with the gas above the liquid level in the vessel and the other communicating with a vent, a valve member actuated by the float between closing positions on each of said seats, respectively, to control the flow of gas through said vent in accordance with the position of said float and a pilot valve actuator for movement relative to said pilot valve, means exposing one side of said actuator continuously to the pressure of gas in said vessel to urge the actuator in one direction, and means exposing the opposite side of said actuator to said vent to apply pressure thereto in accordance with the position of said valve member.

WILLIAM M. MERCER.

REFERENCES CITED

The following references are of record in the file of this patent:

UNITED STATES PATENTS

| Number | Name | Date |
|---|---|---|
| 863,299 | Manning | Aug. 13, 1907 |
| 946,139 | Kitts | Jan. 11, 1910 |
| 1,542,912 | Rockwell | June 23, 1925 |
| 1,795,974 | Stratford | Mar. 10, 1931 |
| 2,226,533 | Krieg | Dec. 31, 1940 |
| 2,265,114 | Hartley | Dec. 2, 1941 |
| 2,312,201 | Thompson | Feb. 23, 1943 |
| 2,360,889 | Philbrick | Oct. 24, 1944 |

FOREIGN PATENTS

| Number | Country | Date |
|---|---|---|
| 24,941 | Netherlands | Apr. 15, 1932 |